Figure 1:
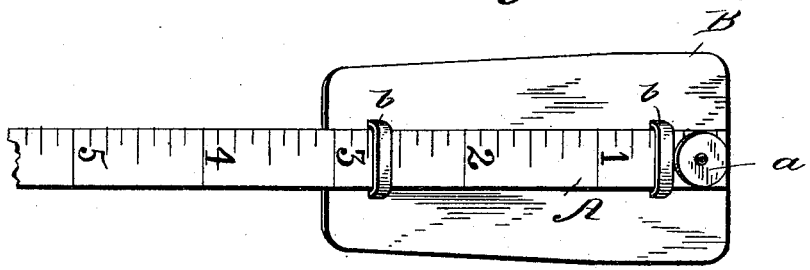

No. 628,475. Patented July 11, 1899.
B. H. KIRK.
TAPE MEASURE.
(Application filed Mar. 5, 1898.)
(No Model.)

Witnesses:
C. M. Sweeney
N. Cushman

Inventor:
Benjamin H. Kirk,
by Henry Calver
Attorney.

THE NORRIS PETERS CO., PHOTO-LITHO., WASHINGTON, D. C.

UNITED STATES PATENT OFFICE.

BENJAMIN H. KIRK, OF CHICAGO, ILLINOIS.

TAPE-MEASURE.

SPECIFICATION forming part of Letters Patent No. 628,475, dated July 11, 1899.

Application filed March 5, 1898. Serial No. 672,795. (No model.)

*To all whom it may concern:*

Be it known that I, BENJAMIN H. KIRK, residing at Chicago, in the county of Cook and State of Illinois, have invented certain new and useful Improvements in Tape-Measures, of which the following is a specification, reference being had therein to the accompanying drawings.

My invention relates to tape-measures, and especially to measures for tailors, seamstresses, &c., in whose work it is sometimes necessary to take measurements from a point which is difficult of access and where the end of the ordinary flexible measure cannot be readily inserted for the purpose of securing accurate measurements. A tape-measure provided with my improvement, however, can be very readily used for securing difficult measurements—as, for example, the inside leg measurement for trousers, the inside arm measurements for coats, shirts, &c.—and the measurements can be made very accurately and quickly. My improved attachment does not, however, interfere with the use of the measure for making the ordinary measurements for which the tape is used, and although it is permanently attached to the tape, so that it is not likely to be lost or mislaid, it can be readily slipped into position for securing difficult measurements or slipped out of the way when the measure is being put to its ordinary uses.

In the drawings which accompany and form a part of this specification I have shown a tape-measure of the ordinary type provided with my attachment.

Figure 3:
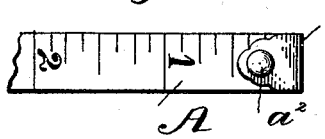
Figure 4:

Figure 1 is a view of a tape-measure with the attachment at the extreme end thereof in the proper position for using the measure in making the measurements mentioned above, while Fig. 2 shows the attachment when the tape-measure is to be used for making ordinary measurements. Figs. 3 and 4 show a slightly-different form of stop from that illustrated in the other views.

In the drawings, A denotes a tape-measure of the kind commonly used, made of cloth or other suitable flexible material, and having the linear divisions and numerals stamped or marked thereon. Sliding freely on said tape-measure A is the attachment, which consists of the plate B, formed of thin sheet metal or of such other non-flexible or comparatively stiff material as will give the necessary rigidity to the attachment, so as to enable it to be inserted in the crotch or under the armpit to hold the end of the tape at the desired point. The plate B is provided with two loops $b$ near either end, said loops being preferably struck up from the metal or material of which the plate is formed. The tape-measure A passes through said loops $b$, rendering freely through them, so that the plate B can be slid to any position on the measure A. At the ends of the tape-measure A, I place stops $a$, which are riveted or otherwise secured to the said tape-measure and project from the surface thereof sufficiently to prevent the tape-measure A from passing completely through the loops $b$, said stops or buttons being so placed that when the plate B is slid to the extreme end of the tape-measure A the end of the latter will register with the outer end of the said plate B, so that the measurements taken when the attachment is used will be accurate. The stop shown in Figs. 3 and 4 consists of a piece of sheet metal $a'$, (preferably brass,) folded over the end of the tape-measure and secured thereto by being punched to form a struck-up projection $a^2$, which cannot pass through the loop $b$.

When the measure is to be used for making a difficult measurement, as the inside trousers-seam, the workman slides the plate B to the end of the tape-measure A until the stop $a$ or $a^2$ strikes the outer loop $b$, and the user then grasps the plate B and inserts it snugly in the crotch or armpit of the person being measured. The tape-measure is then laid along the seam in the usual manner and the measurement taken.

Figure 2:
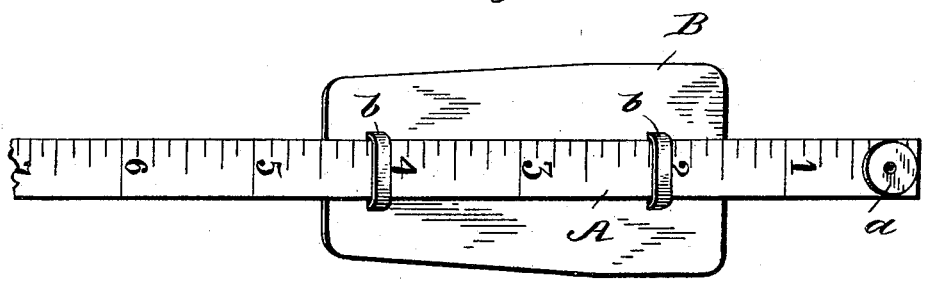

When it is desired to use the measure in making ordinary measurements—as, for example, in measuring off cloth laid upon the table for cutting—the plate B is slid along the tape A out of the way, as shown in Fig. 2, and the measure is used as though it were not provided with the attachment. The plate B being light and perfectly flat does not interfere in the slightest degree with the use of the measure in its ordinary way, and yet said plate is so attached to the tape that it cannot become lost or mislaid, but is always ready for use when difficult measurements are to be taken.

I claim—

1. A flexible tape-measure A, combined with a comparatively rigid or non-flexible plate or attachment B having a sliding connection with the said tape-measure A and the latter being provided with means to prevent the said non-flexible attachment or plate from being disconnected from the said tape-measure while permitting said attachment to be freely slid along the said tape-measure, and a stop being so located as to cause the end of the tape-measure to be brought into register with the end of the attachment-plate when desired.

2. A flexible tape-measure A provided at its ends with suitable stops, combined with the non-flexible or comparatively rigid plate B provided with loops b through which the said tape-measure freely passes, so as to permit the said plate B to be brought into register with the end of the said tape-measure or to be removed to any part of the latter without being disconnected therefrom.

BENJAMIN H. KIRK.

Witnesses:
A. HALE VOLLINTINE,
L. M. ACKLEY.